United States Patent
Treadwell

(10) Patent No.: US 9,378,379 B1
(45) Date of Patent: Jun. 28, 2016

(54) METHOD AND APPARATUS FOR THE PROTECTION OF INFORMATION IN A DEVICE UPON SEPARATION FROM A NETWORK

(75) Inventor: William S. Treadwell, Darby, MT (US)

(73) Assignee: Bank of America Corporation, Charlotte, NC (US)

(*) Notice: Subject to any disclaimer, the term of this patent is extended or adjusted under 35 U.S.C. 154(b) by 371 days.

(21) Appl. No.: 13/161,765

(22) Filed: Jun. 16, 2011

Related U.S. Application Data

(60) Provisional application No. 61/434,347, filed on Jan. 19, 2011.

(51) Int. Cl.
*G06F 21/60* (2013.01)

(52) U.S. Cl.
CPC .................... *G06F 21/602* (2013.01)

(58) Field of Classification Search
CPC ... H04L 9/00; H04L 9/3234; H04L 29/06551; H04L 63/00; H04L 41/28; H04L 12/24; G06F 21/00; G06F 2009/45587; G06F 21/57; G06F 21/577; G06F 21/70; G06F 21/62; G06F 21/60; H04W 12/00
USPC ........................................................ 713/189
See application file for complete search history.

(56) References Cited

U.S. PATENT DOCUMENTS

| | | | |
|---|---|---|---|
| 5,533,123 A * | 7/1996 | Force | G06F 21/10 380/2 |
| 6,199,082 B1 | 3/2001 | Ferrel et al. | |
| 6,289,450 B1 | 9/2001 | Pensak et al. | |
| 6,871,277 B1 * | 3/2005 | Keronen | G06F 21/57 713/165 |
| 6,920,564 B2 | 7/2005 | Decuir | |
| 7,120,868 B2 | 10/2006 | Salesin et al. | |
| 7,756,843 B1 | 7/2010 | Palmer | |
| 7,802,305 B1 | 9/2010 | Leeds | |
| 7,885,944 B1 | 2/2011 | Bruening | |
| 7,940,929 B1 | 5/2011 | Sengupta | |
| 8,141,159 B2 | 3/2012 | Peled et al. | |
| 8,346,077 B1 * | 1/2013 | Uhlhorn | H04B 10/0705 398/1 |

(Continued)

FOREIGN PATENT DOCUMENTS

WO WO 2009/018328 2/2009

OTHER PUBLICATIONS

Burdonov, Igor, Alexander Kosachev, and Pavel Iakovenko. "Virtualization-based separation of privilege: working with sensitive data in untrusted environment." Proceedings of the 1st EuroSys Workshop on Virtualization Technology for Dependable Systems. ACM, 2009.*

Wright, Charles P., Michael C. Martino, and Erez Zadok. "NCryptfs: A Secure and Convenient Cryptographic File System." USENIX Annual Technical Conference, General Track. 2003.*

(Continued)

*Primary Examiner* — Krista Zele
*Assistant Examiner* — Tariq Najee-Ullah
(74) *Attorney, Agent, or Firm* — Weiss & Arons LLP; Michael A. Springs, Esq.

(57) ABSTRACT

Systems, methods and consumer-readable media for providing an system implementing an information lock box. Sensitive files may be identified by the system prior to engagement of the protection system. One method according to the invention may preferably include hiding and/or encrypting sensitive files upon detecting changes of the network status. The information lock box may utilize a file-system driver to control access to files. The system may communicate with administrative serve and communicating messages to a user.

11 Claims, 3 Drawing Sheets

(56) References Cited

U.S. PATENT DOCUMENTS

| | | | |
|---|---|---|---|
| 8,560,833 B2* | 10/2013 | Kumar et al. | 713/151 |
| 2001/0044886 A1 | 11/2001 | Cassagnol et al. | |
| 2002/0143827 A1 | 10/2002 | Crandall | |
| 2003/0036999 A1* | 2/2003 | Mirlas | G06Q 20/102 705/40 |
| 2003/0051159 A1 | 3/2003 | McCown et al. | |
| 2003/0084339 A1* | 5/2003 | Roginsky et al. | 713/201 |
| 2003/0115294 A1 | 6/2003 | Hoang | |
| 2003/0145017 A1 | 7/2003 | Patton et al. | |
| 2004/0010628 A1 | 1/2004 | Gillam et al. | |
| 2004/0179713 A1 | 9/2004 | Tani et al. | |
| 2005/0004922 A1 | 1/2005 | Zernick | |
| 2005/0044059 A1 | 2/2005 | Samar | |
| 2005/0138110 A1* | 6/2005 | Redlich et al. | 709/201 |
| 2005/0264840 A1 | 12/2005 | Niitsuma | |
| 2006/0005017 A1 | 1/2006 | Black et al. | |
| 2006/0041751 A1 | 2/2006 | Rogers et al. | |
| 2006/0072785 A1 | 4/2006 | Davidson et al. | |
| 2006/0075312 A1* | 4/2006 | Fischer | G06F 21/74 714/48 |
| 2006/0101047 A1 | 5/2006 | Rice | |
| 2007/0030528 A1 | 2/2007 | Quaeler et al. | |
| 2007/0073868 A1* | 3/2007 | Nelson et al. | 709/224 |
| 2007/0094594 A1 | 4/2007 | Matichuk et al. | |
| 2007/0277240 A1* | 11/2007 | Durfee et al. | 726/24 |
| 2008/0037065 A1 | 2/2008 | Kawata | |
| 2008/0082618 A1 | 4/2008 | Jones | |
| 2008/0114819 A1 | 5/2008 | Vom Scheidt et al. | |
| 2008/0198421 A1 | 8/2008 | Hirahara et al. | |
| 2009/0037976 A1* | 2/2009 | Teo et al. | 726/1 |
| 2009/0158423 A1 | 6/2009 | Orlassino et al. | |
| 2009/0178144 A1* | 7/2009 | Redlich et al. | 726/27 |
| 2009/0208142 A1 | 8/2009 | Treadwell et al. | |
| 2009/0210347 A1* | 8/2009 | Sarcanin | 705/67 |
| 2009/0254572 A1* | 10/2009 | Redlich et al. | 707/10 |
| 2009/0328166 A1* | 12/2009 | Burch | G06F 21/33 726/6 |
| 2010/0191613 A1* | 7/2010 | Raleigh | 705/26 |
| 2010/0192212 A1* | 7/2010 | Raleigh | 726/7 |
| 2010/0306850 A1 | 12/2010 | Barile et al. | |
| 2010/0313239 A1 | 12/2010 | Chakra et al. | |
| 2011/0030039 A1* | 2/2011 | Bilange | H01L 63/08 726/5 |
| 2011/0035783 A1 | 2/2011 | Terasaki et al. | |
| 2011/0154016 A1* | 6/2011 | Niccolini | H04L 63/0428 713/150 |
| 2011/0179119 A1 | 7/2011 | Penn | |
| 2011/0179352 A1 | 7/2011 | Treadwell et al. | |
| 2012/0110320 A1* | 5/2012 | Kumar et al. | 713/151 |
| 2012/0216242 A1* | 8/2012 | Uner et al. | 726/1 |

OTHER PUBLICATIONS

Ben Waldron, "Realizing the Potential of Office 2003 by Creating Smart Tags in Managed Code" (http://msdn.microsoft.com/en-us/magazine/cc163839.aspx), MSDN Magazine, Microsoft Corporation, Redmond, WA, Feb. 2005.

Jan Fransen, "Using Smart Tags with Research Services for the Microsoft Office System" (http://msdn.microsoft.com/en-us/library/aa159677(printer).aspx), MSDN Magazine, Microsoft Corporation, Redmond, WA, Dec. 2003.

"About Smart Tags" (http://office.microsoft.com/en-us/word/HP030833041033.aspx), Microsoft Corporation, Redmond, WA, Sep. 2008.

"Complete tasks quickly with Smart Tags in Office XP" (http://office.microsoft.com/en-us/help/HA010347451033.aspx), Microsoft Corporation, Redmond, WA, Jan. 6, 2010.

Claire Jarrett, "Smart Tags in Microsoft Office" (http://ezinearticles.com/?Smart-Tags-in-Microsoft-Office&id=1084575), EzineArticles.com, Green Bay, WI, Apr. 2008.

"NAC Smart Tag DLL That Turns Microsoft Office into Powerful Easy-To-Use GIS" (http://www.nacgeo.com/nactag.asp), NAC Geographic Products Inc., Toronto, Ontario, Canada, Jun. 28, 2009.

"The Microsoft Common Speller API (CSAPI) for Office Spell Checking" (http://support.microsoft.com/kb/262605), Microsoft Corporation, Redmond, WA, Jul. 2007.

Lixin Zhou, "NAC Smart Tag Turns Microsoft Office into a GIS" (http://slashgeo.org/submit.pl?op=viewsub&subid=376&note=&title=NAC+Smart+Tag+Turns+Microsoft+Office+into+A+GIS), Slashgeo.org, Brea, CA, Feb. 2007.

International Search Report for International Application PCT/US/11/21061, Feb. 28, 2011.

Dan Jurden, "Smart Tags in Office 2003" (http://www.code-magazine.com/Article.aspx?quickid=0302042), EPS Software, Spring, TX, Feb. 2006.

"OFFXP: How to Create a Microsoft Office Smart Tag List" (http://support.microsoft.com/kb/287698), Microsoft Corporation, Redmond, WA, Jan. 2007.

"Taceo Pro" (http://www.bestshareware.net/taceo.htm), Best Shareware, Jan. 14, 2006.

Colin Wilcox et al. "Add Power to Word Searches With Regular Expressions"(http://office.microsoft.com/en-us/help/HA010873051033.aspx), Microsoft Corporation, Accessed May 29, 2009.

Colin Wilcox et al, "Putting Regular Expressions to Work in Word" (http://office.microsoft.com/en-us/help/HA010873041033.aspx), Microsoft Corporation, Accessed May 29, 2009.

UK Intellectual Property Office Search Report for United Kingdom Patent Application No. 0902485.2, Jun. 4, 2009.

First Examination Report for Indian Patent Application No. 262/KOL/2009, Feb. 14, 2014.

\* cited by examiner

METHOD AND APPARATUS FOR THE PROTECTION OF INFORMATION IN A DEVICE UPON SEPARATION FROM A NETWORK

CROSS-REFERENCE TO RELATED APPLICATION

This application claims priority to U.S. Provisional Patent Application No. 61/434,347, filed on Jan. 19, 2011, entitled, "Information Lock Box."

FIELD OF TECHNOLOGY

Aspects of the disclosure relate to content-aware document protection.

BACKGROUND

A threat to information security may come from many different avenues. One weakness in information security of critical importance is the existence of "sensitive" information contained on mobile devices (i.e. laptops).

If a mobile device is stolen, the information contained on the hard drive is potentially exposed. Furthermore, once sensitive data leaves an institution—e.g., on a laptop—there is little that can be done to protect the data.

Conventional data loss prevention systems may, for example, scan-and-identify potentially sensitive information and prevent data from being written to removable media. But no current system ensures that sensitive information can only be viewed and/or modified within a known geographic location.

SUMMARY OF THE INVENTION

It is an object of this invention to provide systems and methods that ensure that information identified as sensitive is protected. The systems and methods according to the invention, preferably protect sensitive information with or without the existence of independent hard disk encryption.

The information is protected based on network connectivity. When the computer is not attached to a known-safe network, sensitive information is protected by the invention.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
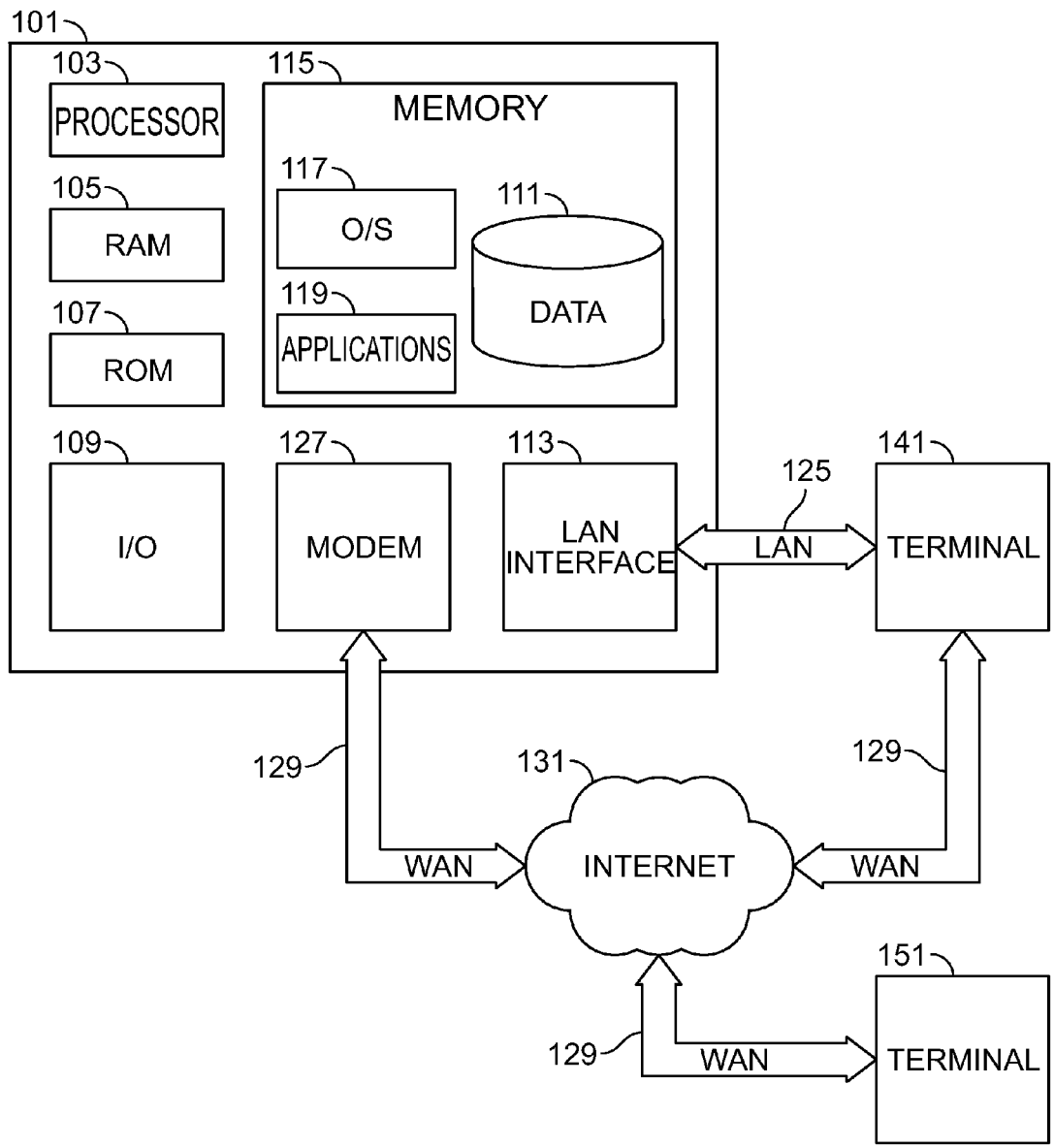
FIG. 1 illustrates a schematic diagram of a general-purpose digital computing environment in which one or more aspects of the present invention may be implemented.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, flash storage and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

An Information Lock Box ("ILB") according to the invention preferably ensures that information identified as sensitive is protected. Sensitive information may be identified as described in patent application Ser. No. 12/033,139 which is hereby incorporated by reference, or any other suitable system. In systems and methods according to the invention, this information is preferably protected with or without the existence of independent hard disk encryption.

Systems and methods according to the invention may provide content-aware document analysis and modification. When handling information, document users may be unaware (or are not sufficiently reactive to the fact) that the information contained in a document is confidential, sensitive or proprietary. It would be advantageous to have a system according to the invention that periodically or substantially continually checks document content to determine whether the document includes patterns of information that typically include confidential, sensitive or proprietary information. In one embodiment, such a system could operate in a manner that is transparent to a user.

A system according to the invention may determine whether previously identified sensitive, confidential or secret information is found in a document, presentation, or spreadsheet. In certain embodiments of the invention, templates can be used to detect and change key factors such as color, graphics, and embedded characteristics of the identified sensitive and/or confidential information based on the previously identified sensitivity of information provided to the template.

The system according to the invention preferably provides a set of rules and/or templates that can be applied to documents to analyze and modify the document's content. Accordingly, unlike selecting a template that is for application to a static document, by using code or plugins that can detect when certain patterns of information is entered and alter or indentify the content as needed, the visible and invisible characteristics of a document may also be changed.

The process could also be extended to form an "appropriateness" rule which could be akin to, or, alternatively, implemented as a part of, grammar rules or spell checking. Such a process could provide a visible means to note that a document contains noticeable and/or unacceptable amounts or occurrences of patterns of confidential data.

Certain embodiments of the ILB include a system that may include three (3) core parts to reside within, or be accessible from, an operating system such as Windows XP, manufactured by Microsoft of Redmond, Wash.:

1. A file-system driver (kernel-level) component that is responsible for hiding and encrypting/decrypting files;

2. A service (user-mode) component that is responsible for detecting changes to the network, communicating with the file-system driver, communicating with administrative server; and 3. A user Interface (user-mode) component that communicates messages to the user.

The file-system driver ("FSD") is responsible for hiding and/or encrypting data contained in files. The operation of the FSD may be based on queues—i.e., instructions received from the service component—as described below in more detail.

Once loaded into the operating system, the FSD may be in a disengaged state where it may or may not encrypt some or all of the files identified as sensitive. So long as the ILB is connected to a known-safe network, all files, including sensitive files, are preferably visible to the user. Sensitive information may be decrypted and accessed as needed when the ILB is connected to a known-safe network.

Encryption of files may include encrypting all of a sensitive file or only the portions of the file which are sensitive. Encryption may consist of simple scrambling or secure encryption. Secure encryption may utilize symmetric key algorithms— e.g., DES, AES-128, AES-256—or another suitable algorithm. Encryption may also utilize asymmetric i.e., public key—encryption. Suitable combinations of symmetric and asymmetric key encryption may also be utilized. Private and symmetric keys are preferably stored in a hardware device or another suitably secure manner, and released only to a verified operating system including the FSD.

The FSD may be dormant until the FSD receives a communication from the service component instructing the FSD to engage. Once engaged, the FSD preferably hides from view any file that has a predetermined, preferably specially-designated, attribute. Accordingly, a user cannot see, open, delete, etc. any file possessing this special attribute.

Furthermore, once engaged, any file that is created and/or modified and that contains sensitive information may remain encrypted on the hard disk and may only be decrypted through the FSD. This prevents anyone from removing the hard drive and opening the files using an external process. In the alternative, sensitive files are encrypted upon detection of a network status change—e.g., when the ILB is disconnected from a known-safe network.

The service component's primary responsibility is to monitor network status changes. In some embodiments of the invention, if a device is connected to a "trusted" network (the parameters of "trust" may be defined by the system administrator) then the user should have the ability to view and modify files at will. However, if the device leaves this trusted network, as determined by the service component, the system may lock down either all files on the hard disk, only sensitive files or portions of sensitive files.

Specifically, when a status change to the network is detected, the service component may send a queue to the FSD telling it to engage in locking down the hard disk and/or selected sensitive files located thereon. The service component may also be responsible for "dialing" home—e.g., contacting the trusted network directly or from a virtual private network—in order to get any updates or configuration changes—e.g., changes in the list of known-safe networks and/or "trust" parameters.

The User Interface Component (herein referred to as the UIC) may be responsible for presenting information to the user of the system. This information may include any alerts, logging information, exception codes, etc. When the user leaves the "trusted network" environment, the UIC may allow the user, in certain embodiments, to enter an exception code that instructs the FSD to disengage. This instruction may be recorded and tracked by a system or by the system administrator.

FIG. 1 illustrates a block diagram of a generic computing device 101 (alternatively referred to herein as a "server") that may be used according to an illustrative embodiment of the invention as an Information Lock Box. The computer server 101 may have a processor 103 for controlling overall operation of the server and its associated components, including RAM 105, ROM 107, input/output module 109, and memory 115.

I/O module 109 may include a microphone, keypad, touch screen, and/or stylus through which a user of device 101 may provide input, and may also include one or more speakers for providing audio output and a video display device for providing textual, audiovisual and/or graphical output. Software may be stored within memory 115 and/or RAM 105 and/or ROM 107 to provide instructions to processor 103 for enabling server 101 to perform various functions. For example, memory 115 may store software used by server 101, such as an operating system 117, application programs 119, and an associated database 121. Alternatively, some or all of server 101 computer executable instructions may be embodied in hardware or firmware (not shown). As described in detail below, database 121 may provide centralized storage of account information and account holder information for an entire business, allowing interoperability between different elements of a business residing at different physical locations.

Application program 119 may implement some or all of the elements of the Information Lock Box. The file system driver may be implemented as an application or as a component of the operating system. Likewise the service module may be an operating system component or may access operating system components to achieve the appropriate functionality. The user interface component may also rely on operating system components.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119 used by server 101 according to an illustrative embodiment of the invention may include computer executable instructions for invoking user functionality related to communication, such as email, short message service ("SMS"), and voice input and speech recognition applications.

Computing device 101 and/or terminals 141 or 151 may also be mobile terminals including various other components, such as a battery, speaker, and antennas (not shown).

The invention may be described in the general context of computer-executable instructions, such as program modules, being executed by a computer. Generally, program modules include routines, programs, objects, components, data structures, etc. that performs particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
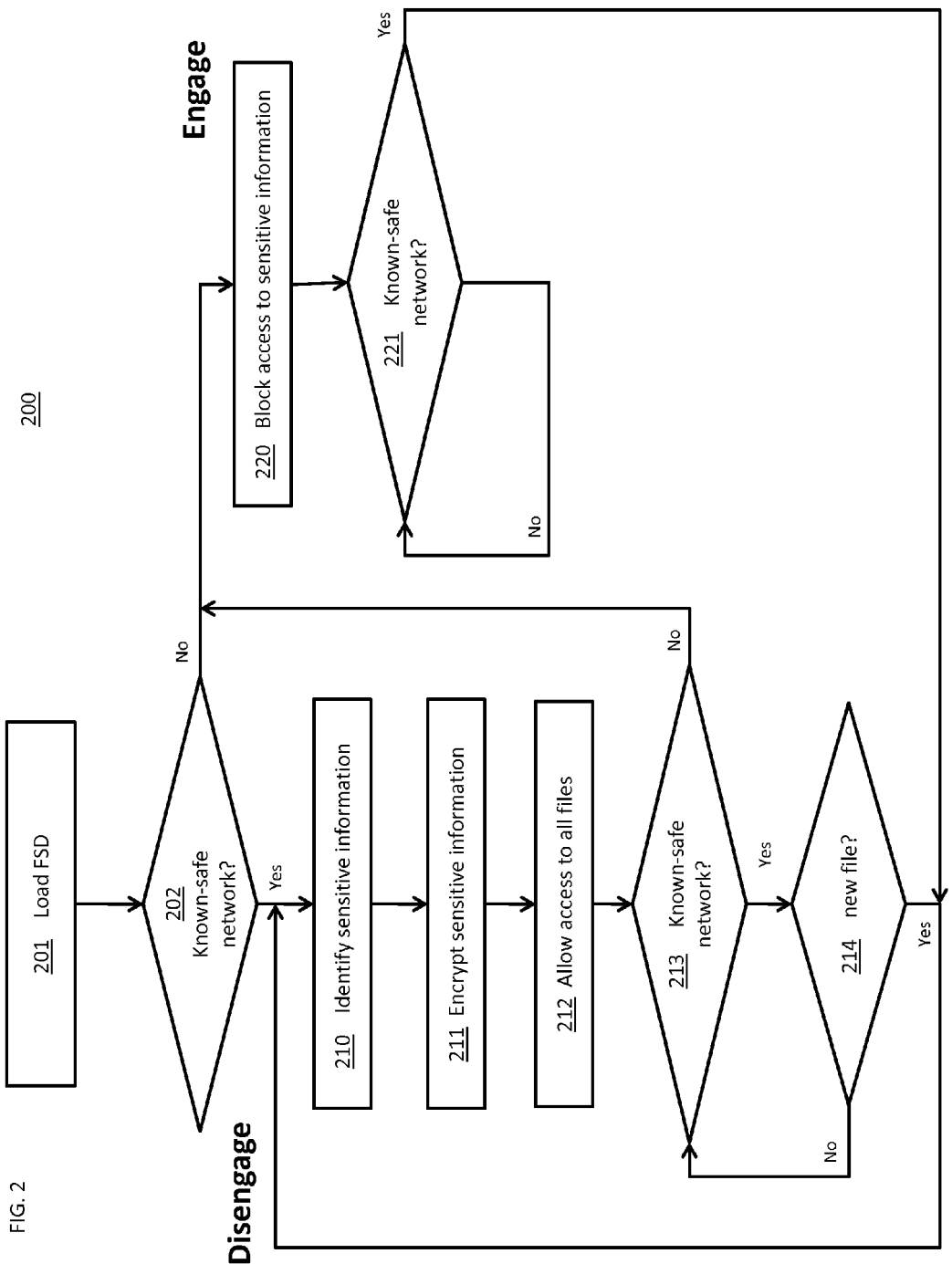
FIG. 2 shows a flow chart 200 of an embodiment of an Information Lock Box system.

FIG. 2 shows a flow chart 200 of an embodiment of an ILB system. At step 201, the FSD is may be loaded onto the server. At step 202, the FSD may determine if the server is connected to a known-safe network. If the server is connected to a known-safe network, the FSD is said to be disengaged. If the FSD is disengaged, the FSD may identify sensitive information or sensitive files which reside on the server at step 210. Sensitive information or sensitive files may be tagged by the FSD. The FSD may search the memory 115, RAM 105 and ROM 107 for sensitive files. In the alternative the FSD may only identify sensitive files when directed to by a user, when files are created or modified or due to any other suitable stimulus.

At step 211, the FSD may encrypt sensitive files or sensitive information within files, leaving other parts of a file un-encrypted (in the clear). At step 212 the FSD may allow access to all files in the ILB. Access may include allowing the files to be visible in a file listing tool—e.g., the explorer tool under windows or the "ls" listing command in UNIX. Access may also mean allowing a file to be read, written or modified.

At step 213, the FSD may determine if the server is connected to a known-safe network. If the server remains connected to a known-safe network, the FSD may remain disengaged and proceeds to step 214. If the server is no longer connected to a known-safe network, the FSD is engaged and goes to step 220.

At step 214, the FSD may determine if a new file has been created. If a new file has been created than the FSD returns to step 210 to identify sensitive information, encrypt sensitive information and allow access to the new file. A marking system may be used by the FSD so that only the new file and not every file is processed. If a new file has not been created than the FSD returns to step 213.

If at step 202 the FSD determines that the ILB is not connected to a known-safe network then the FSD is engaged. When the FSD is engaged the FSD may block access to sensitive information at step 220. In the alternative the FSD may block access sensitive information within files or to all files. Blocking access may include not listing the files in a file listing tool—e.g., the explorer tool under windows or the "ls" listing command in UNIX. Blocking access may also mean blocking reading, writing or modification of a files or files. Blocking access may also mean presenting redacted files. In addition, encrypted files are preferably not decrypted by the FSD when it is engaged.

At step 221, the FSD may determine if the server is connected to a known-safe network. If the server remains disconnected from a known-safe network, the FSD may remain engaged and returns to step 221. If the server is now connected to a known-safe network, the FSD may disengage and go to step 210.

A user interface component may inform the user when the FSD enters the engaged or the disengaged state. The user interface may also inform the user about the progress of file inspection and/or encryption.

The user interface component may also inform the user when any file is designated as sensitive. In addition the user interface may also inform the user when a file is encrypted. The indications may take the form of special fonts, colors, symbols or any other suitable method, which is displayed when files are listed or opened. If a file contains sensitive information, special fonts, colors, symbols or any other suitable method may be used to indicate the sensitive portions of a file. The user interface component may also indicate that access to a file is blocked. The user interface may also inform the user by the use of sounds and/or pop up messages or any other suitable method.

Figure 3:
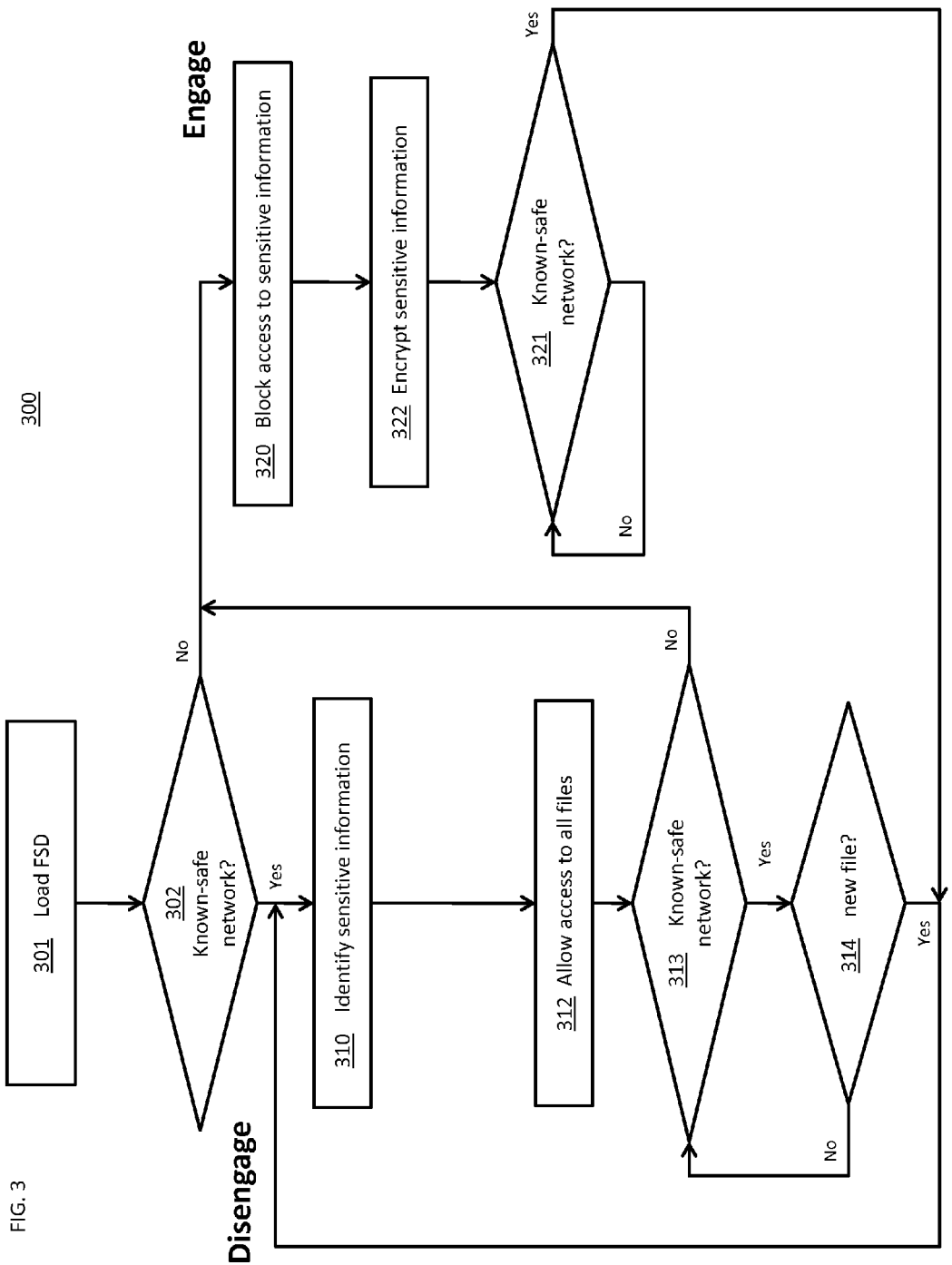
FIG. 3 illustrates a flow chart of an alternative embodiment of an Information Lock Box system.

FIG. 3 shows a flow chart 300 of an alternative embodiment of an ILB system. At step 301, the FSD is may be loaded onto the server. At step 302, the FSD may determine if the server is connected to a known-safe network. If the server is connected to a known-safe network, the FSD is said to be disengaged. If the FSD is disengaged, the FSD may identify sensitive information or sensitive files which reside on the server at step 310. Sensitive information or sensitive files may be tagged by the FSD. The FSD may search the memory 115, RAM 105 and ROM 107 for sensitive files. In the alternative the FSD may only identify sensitive files when directed to by a user, when files are created or modified or due to any other suitable stimulus.

At step 312 the FSD may allow access to all files in the ILB. Access may include allowing the files to be visible in a file listing tool—e.g., the explorer tool under windows or the "ls" listing command in UNIX. Access may also mean allowing a file to be read, written or modified.

At step 313, the FSD may determine if the server is connected to a known-safe network. If the server remains connected to a known-safe network, the FSD may remain disengaged and proceeds to step 314. If the server is no longer connected to a known-safe network, the FSD is engaged and goes to step 320.

At step 314, the FSD may determine if a new file has been created. If a new file has been created than the FSD returns to step 310 to identify sensitive information, encrypt sensitive information and allow access to the new file. A marking system may be used by the FSD so that only the new file and not every file is processed. If a new file has not been created than the FSD returns to step 313.

If at step 302 the FSD determines that the ILB is not connected to a known-safe network then the FSD is engaged. When the FSD is engaged the FSD may block access to sensitive information at step 320. In the alternative the FSD may block access sensitive information within files or to all files. Blocking access may include not listing the files in a file listing tool—e.g., the explorer tool under windows or the "ls" listing command in UNIX. Blocking access may also mean blocking reading, writing or modification of a files or files. Blocking access may also mean presenting redacted files. In addition, encrypted files are preferably not decrypted by the FSD when it is engaged.

At step 322, the FSD may encrypt sensitive files or sensitive information within files, leaving other parts of a file un-encrypted (in the clear).

At step 321, the FSD may determine if the server is connected to a known-safe network. If the server remains disconnected from a known-safe network, the FSD may remain engaged and returns to step 321. If the server is now connected to a known-safe network, the FSD may disengage and go to step 310.

Although the flow charts 200 and 300 show an "polling" loop where the FSD continually checks for a change in network status or for the appearance of a new file other embodiments are contemplated and included within the scope of the invention. One alternative embodiment utilizes the service component to interrupt the FSD when a change is made to network connectivity and/or a file is created/modified. Either the FSD or the service component may judge if a network status change leaves the server connected to a known-safe network or not. In all cases a detection of a new file may also be a detection of the modification of an existing file.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for providing an information lock box according to the invention have been provided. Persons skilled in the art will appreciate that the present invention can be practiced by other than the described embodiments, which are presented for purposes of illustration rather than of limitation, and the present invention is limited only by the claims which follow.

The invention claimed is:

1. A method for protecting sensitive information stored on a computer device, the method comprising:
    using a hardware service component resident on the device, detecting a first change in network access of the device, the first change comprising a switch of access, by the device, from a trusted network to an untrusted network;
    using the hardware service component, communicating the first change in network access to a software file-system driver that is resident on the device, wherein the software file-system driver is a kernel-level component;
    using the software file-system driver, hiding and encrypting a sensitive file that resides locally on the device in response to detection by the hardware service component of the first change in network access from the trusted network to the untrusted network;
    using the hardware service component, detecting a second change in network access of the device, the second change comprising a switch of access, by the device, from the untrusted network to the trusted network; and
    using the software file-system driver, decrypting and displaying the sensitive file in response to detection by the hardware service component of the second change in network access from the untrusted network to the trusted network;
    wherein:
        in response to the first change from the trusted network to the untrusted network, the software file-system driver searches for the sensitive file in ROM, RAM and on a hard disk of the device;
        when the sensitive file is hidden and encrypted, a user of the device cannot see, open and delete the sensitive file when using the device;
        when the sensitive file is decrypted and displayed, the user of the device may see, open and delete the sensitive file when using the device; and
        when the device is connected to the untrusted network, the software file-system driver performs a polling loop that continually checks for creation of a new sensitive file stored locally on the device and, in response to detecting the creation of the new sensitive file, encrypts and hides the new sensitive file.

2. The method of claim 1 further comprising, marking the sensitive file.

3. The method of claim 1 wherein the sensitive file is a portion of a file.

4. The method of claim 1 further comprising, informing the user of the loss of access to the sensitive file.

5. The method of claim 1 further comprising, providing access to the sensitive file when the computer is re-connected to a known-safe network.

6. A mobile device for protecting sensitive information comprising:
    a memory configured to store execution instructions and a sensitive document; and
    a processor coupled with the memory, the processor configured to execute the instructions, the instructions configured to cause the processor to:
    using a hardware service component resident on the mobile device, detect a first change in network access of the device, the first change comprising a first switch of access, by the device, from a trusted network to an untrusted network;
    using the hardware service component, communicating the first change in network access to a file-system driver that is resident on the mobile device, wherein the file-system driver is a kernel-level component;
    using the file-system driver, hide and encrypt a sensitive document that resides locally on the mobile device in response to detection by the hardware service component of the first switch;
    using the hardware service component, detect a second change in network access of the device, the second change comprising a second switch of access, by the mobile device, from the untrusted network to the trusted network; and
    using the file-system driver, decrypt and display the sensitive document that resides locally on the mobile device in response to detection by the hardware service component of the second switch;
    wherein:
        in response to the first change from the trusted network to the untrusted network, the file-system drive searches for the sensitive document in ROM, RAM and on a hard disk of the device;
        when the sensitive file is encrypted and hidden, a user of the device cannot see, open and delete the sensitive document when using the device;
        when the sensitive file is decrypted and displayed, the user of the device may see, open and delete the sensitive document when using the device; and
        when the mobile device is connected to the untrusted network, the file-system performs a polling loop that continually checks for creation of a new sensitive document stored locally on the mobile device and, in response to detecting the creation of the new sensitive document, encrypts and hides the new sensitive document.

7. The device of claim 6 wherein the execution instructions are configured to cause the processor to mark the sensitive document.

8. The device of claim 6 wherein the sensitive document is a portion of a file.

9. The device of claim 6 wherein the execution instructions are configured to cause the processor to inform the user of the loss of access to the sensitive document.

10. The device of claim 6 wherein the execution instructions are configured to cause the processor to provide access to the sensitive document when the device is re-connected to the trusted network.

11. The device of claim 8 wherein the file-system driver encrypts and hides only the portion of the file.

* * * * *